United States Patent [19]
Femrite

[11] Patent Number: 5,203,639
[45] Date of Patent: Apr. 20, 1993

[54] SINUOSE DADO JOINT

[76] Inventor: Loren G. Femrite, Rte. 2, Box 20, Dawson, Minn. 56232

[21] Appl. No.: 696,057

[22] Filed: May 6, 1991

[51] Int. Cl.$^5$ ............................................. F16B 12/02
[52] U.S. Cl. ................... 403/382; 403/340; 403/364; 403/403; 52/536; 52/539
[58] Field of Search ............... 403/381, 364, 340, 339, 403/403, 334, 333, 382, 231, 401, 230, 244, 347, 400; 52/536, 539

[56] References Cited

U.S. PATENT DOCUMENTS

| | | |
|---|---|---|
| 350,803 | 10/1886 | Camburn . |
| 491,383 | 2/1893 | Stiggleman . |
| 1,067,910 | 7/1913 | Florey ................................ 403/381 |
| 2,430,200 | 11/1947 | Wilson . |
| 3,692,340 | 9/1972 | Roth ................................... 403/364 |
| 4,025,215 | 5/1977 | Murdock et al. . |
| 4,057,356 | 11/1977 | Nissen . |
| 4,112,986 | 9/1978 | Strange et al. . |
| 4,274,756 | 6/1981 | Lange . |
| 4,352,588 | 10/1982 | Davies, III .......................... 403/382 |
| 4,760,870 | 8/1988 | Speck . |

FOREIGN PATENT DOCUMENTS 190289  5/1992  United Kingdom ................ 403/339

Primary Examiner—Andrew V. Kundrat
Assistant Examiner—Harry C. Kim
Attorney, Agent, or Firm—Jacobson, Price, Holman & Stern

[57] ABSTRACT

A dado joint is provided between first and second members and includes at least one elongated groove formed in the first member of a constant width and constantly varying depth in the likeness of a shallow, smoothly curving sine wave. The second member includes a marginal edge tongue of constant thickness for mating with and snug reception within the groove, the tongue including a sine wave likeness longitudinal contour corresponding to the aforementioned sine wave and being seated and secured in the groove. A first form of the invention includes a single groove and mating tongue portion while a second form of the invention includes double adjoining grooves in the first member with the shallower and deeper groove portions of one groove being laterally registered with the deeper and shallower portions of the other groove, respectively, and a tongue equipped second member including a pair of mating tongue portions also being longitudinally offset relative to each other whereby the projections and recesses defined by one tongue portion are laterally registered with the recesses and projections, respectively, of the other tongue portion.

8 Claims, 2 Drawing Sheets

SINUOSE DADO JOINT

BACKGROUND OF THE INVENTION

1. Field of the Invention

This invention relates to a joint to be produced by a dado machine, but which has been modified to make a sinuose dado, for the production of joints. This type of joint has application in the cabinet making industry and also other applications which require precision and structural strength in the joining of panel material.

2. Description of Related Art

Various different modified forms of dado joints and other similar joints heretofore have been provided such as those disclosed in U.S. Pat. Nos: 350,803, 491,383, 2,430,200, 4,025,215, 4,057,356, 4,112,986, 4,274,756 and 4,760,870. However, these previously known forms of modified dado joints and other similar joints do not include the sinuose dado groove (varying depth) and complimentary dado tongue portions of the instant invention.

SUMMARY OF THE INVENTION

The cabinet making industry essentially is the applied art of appropriately cutting and joining panel or sheet material into quality cabinetry. Essential to the art is the production of structurally strong and artisticly pleasing joints. To obtain sufficient strength many systems have developed, including glued surfaces, various tongues, grooves and dados, as well as braces, screws, bolts, nuts, nails, biscuits, staples and dowels, etc.

The main goal in cabinetry making other than providing quality cabinetry which is artisticly pleasing is the production of structurally strong, yet simple to produce joints. To understand fully the advantages of the sinuose dado joint of the instant invention, the characteristics of the material used first must be considered.

The primary sheet or panel stock used in today's cabinet industry is made of pressed fibers or particles of wood. The process of fabrication produces a sheet with a profile that is hard at the surface layers and soft at the core. The surface tension of the surface layers gives the pressed board it strength and rigidity. These characteristics complicate attaching one sheet to another, edge to face, as in cabinet construction. The harder surface layers and softer core cannot be successfully butt jointed. A cut with a dado joint through the surface layers typically will cause deformation of the sheet and a marked loss of strength. Screws which penetrate the core edgewise tend to loosen or strip in the soft central core and doweling processes that have been used include multiple steps and require extensive mechanization.

The sinuose dado joint of the instant invention addresses the characteristics of pressed board in two simple steps. A sinuose dado cut is made into the face of the sheet stock, plunging from surface to core to surface, etc., and a matching contour cut is made along the end edge (tongue) of the sheet to be connected. Then, these two pieces then are glued together. Of course, applications and sheet thickness call for a profile to match the product. For instance, a shoulder type of joint, such as that illustrated in FIG. 3 to be hereinafter more fully described, may be used with pre-finished material in order that the glueable surface is exposed producing a strong joint. When a blind joint, (such as that illustrated in FIG. 4 and to be hereinafter more fully described), is used, the use thereof is in a situation where a clear finished corner is desired or required.

The variable depth dado groove portion of the instant invention allows for penetration of the sheet to the glueable core. As the groove returns to the surface of the sheet, the harder surface layer of the sheet remains intact so that much of the skin tension can be retained. However, as the bottom of the groove returns close to the surface, only a fractional amount of the surface material is removed, thus allowing glue contact along the whole joint, such as when a pre-finished material is being used.

Again, the surface layers of pressed fiber or particle board are the hardest portions thereof and the center zones of such boards are the softest or weakest portions thereof. Accordingly, if a conventional face dado groove is formed in one side of a particle board of three quarter inches in thickness and the depth of the dado groove approaches three eighths of an inch, the remainder of the grooved portion of the board has an effective thickness of only three eighths of an inch, which three eighths of an inch includes approximately three sixteenths of an inch of soft material and only three sixteenths of an inch of hard material. However, if a sinuose dado groove is formed in one face of a similar board, only the deepest portions of the sinuose groove will result in such seriously weakened areas of the board and the shallower and substantially non-existent depth portions of the grooves will retain substantially all of the surface strength of the grooved side of the board, resulting in the board retaining a major portion of its strength in the grooved area thereof as opposed to losing a major portion of its strength when a constant depth dado groove is used.

The main object of this invention is to provide a dado joint which will enable the dado grooved side of a board to retain a major portion of the outer layer tension thereof as opposed to conventional dado grooving which eliminates all of the outer layer tensioning thereof.

Another object of this invention is to provide a dado joint which also may be used in edge to edge jointing as well as in edge to face jointing.

Still another object of this invention is to provide a dado joint with increased glue surface area.

A still further object of this invention is to provide a dado joint which, when formed with programmed machines on a production line, may automatically determine proper positioning of the two members to be joined by the sinuose dado joint.

A further object of this invention is to provide an edge joining dado joint resulting in a curve blended joint.

A final object of this invention to be specifically enumerated herein is to provide a dado joint which will conform to conventional forms of manufacture, be of simple construction, and a joint of increased strength so as to provide device that will be economically feasible, long-lasting and readily adaptable to providing a strong joint between pressed fiber or particle board members.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
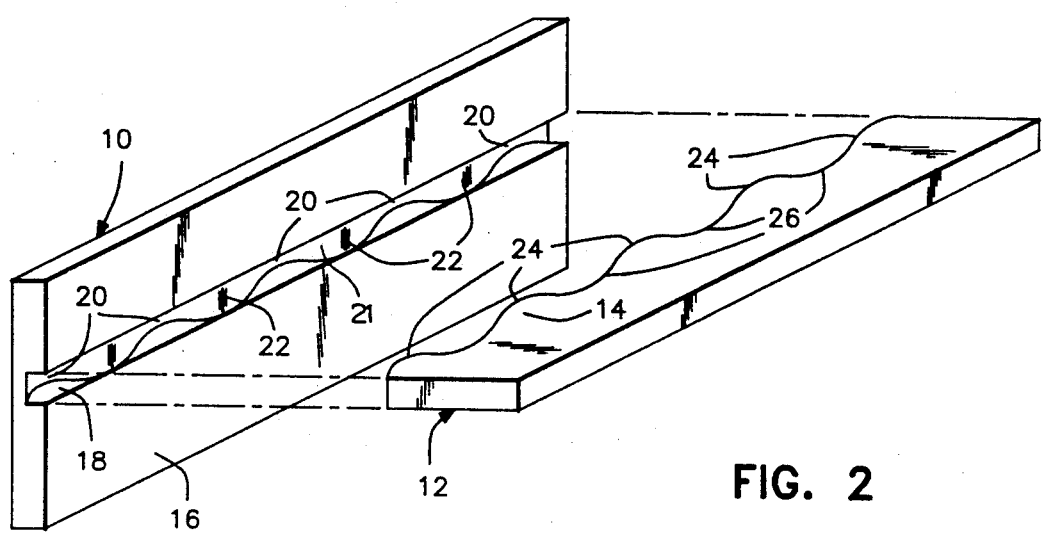
FIG. 1 is an exploded perspective view of a typical edge to face sinuose dado joint constructed in accordance with the present invention.

Referring now more specifically to the drawings the numeral 10 generally designates a first panel member or sheet to which a second panel member or sheet referred to in general by the reference numeral 12 is to be joined with one marginal edge portion 14 of the panel member 12 being glued to one side face 16 of the panel member 10.

In conventional dadoing jointing, the marginal edge portion 14 would be longitudinally straight and the panel member 10 would be provided with a constant depth groove formed in the side face 16.

However, when utilizing a sinuose dado joint of the instant invention, the side face 16 of the panel member 10 is provided with a straight groove 18 of constantly varying depth. The groove 18 is of constant width and longitudinally straight, but includes alternating maximum depth portions 20 and minimum or almost nonexistent, depth portions, wherein the bottom surface 21 of the groove is basically in the form of a shallow sine wave and is of greater length than the bottom surface of a conventional flat bottom groove of the same length.

The apparatus for forming the groove 18 comprises a conventional router, dado or milling machine (not shown) but which has been modified to alternately plunge and raise the depth of cut as the dado head moves along the side face 16.

In order to match the groove 18, the marginal edge portion 14 of the panel member 12 is similarly routed to include rounded projections 24 and rounded recesses 26 for coaction with the maximum depth and minimum depth portions 20 and 22 of the groove 18. Thereafter, the bottom of the groove 18 of the panel member 10 and contoured edge portion 14 of the panel member 12 have glue applied thereto and the panel members 10 and 12 are then joined together. It will be noted that the positioning of the rounded projections 24 and rounded recesses along the panel member 12 determine the ultimate positioning of the panel member 12 relative to the panel member 10. Accordingly, when the machinery utilized to form the groove 18 and to contour the marginal edge portion 14 are properly computerized, precise ultimate positioning of the panel member 12 relative to the panel member 10 is assured.

Figure 2:
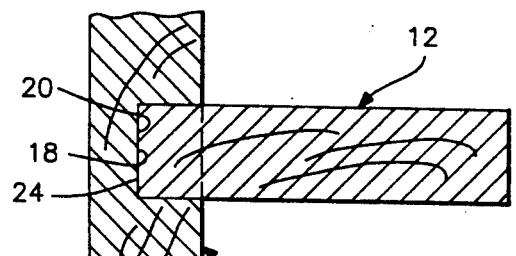
FIG. 2 is an enlarged fragmentary vertical sectional view of the adjacent portions of the elements illustrated in FIG. 1 after being joined.

FIG. 2 clearly illustrates that the groove 18, at its deepest portions 20, extends approximately one-half way through the panel member 10 and that the corresponding rounded portions 24 of the panel member 12 penetrate into the deepest portions 20 of the groove 18.

The actual gluing carried out between the panel member 10 and the panel member 12 has been omitted from the drawing for the purpose of clarity. Further, the surface 16 as well as the upper and lower surfaces of the panel member 12 may be "finished" either through the utilization of a vinyl layer or some other form of veneer layer or the like.

Figure 3:
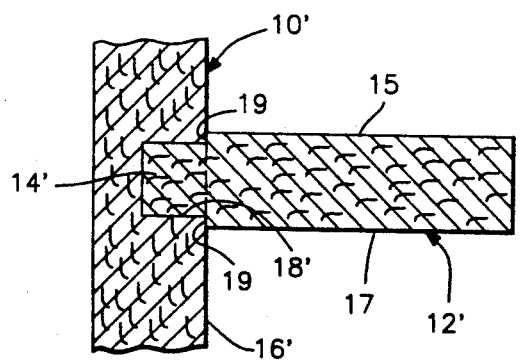
FIG. 3 is a fragmentary vertical sectional view similar to FIG. 2 but illustrating a cut shoulder joint application of the dado joint.

With attention now invited more specifically to FIG. 3, a modified form of sinuose dado joint is illustrated incorporating a panel member 10' having a sinuose groove 18' formed therein corresponding to the sinuose groove 18, but which is slightly narrower than the sinuose groove 18. In addition, the panel member 12' corresponding to the panel member 12 includes a slightly narrowed marginal edge portion 14' inwardly offset slightly from each of the opposite side surfaces 15 and 17 of the panel member 12', but which otherwise corresponds to the marginal edge portion 14. Inasmuch as the panel members 12 and 12' are otherwise of the same thickness, the narrowed contoured marginal edge portion 14 defines a pair of shoulders 19 which abut the surface 16' of the panel member 10'.

Figure 4:
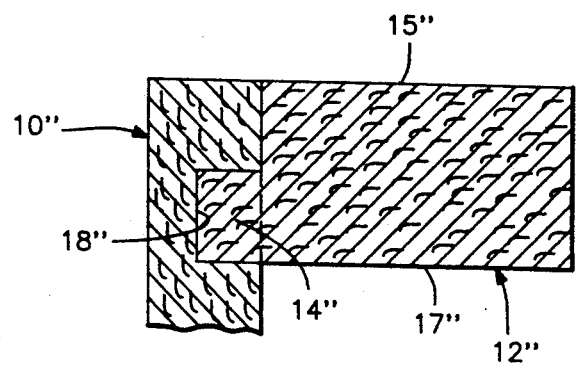
FIG. 4 is a fragmentary vertical sectional view similar to FIGS. 2 and 3 but illustrating a blind joint application.

With attention now invited more specifically to FIG. 4, a blind sinuose dado joint is illustrated between a panel member 10" and a panel member 12", the panel member 10" having a groove 18" corresponding exactly to the groove 18 and the panel member 12 being of greater thickness and including only a half thickness contoured marginal edge portion 14", inwardly offset from surface 15" and coextensive with surface 17"', received within the groove 18". Of course, the width of the groove 18" and the contoured marginal edge portion 14" may be varied as desired.

Figure 5:
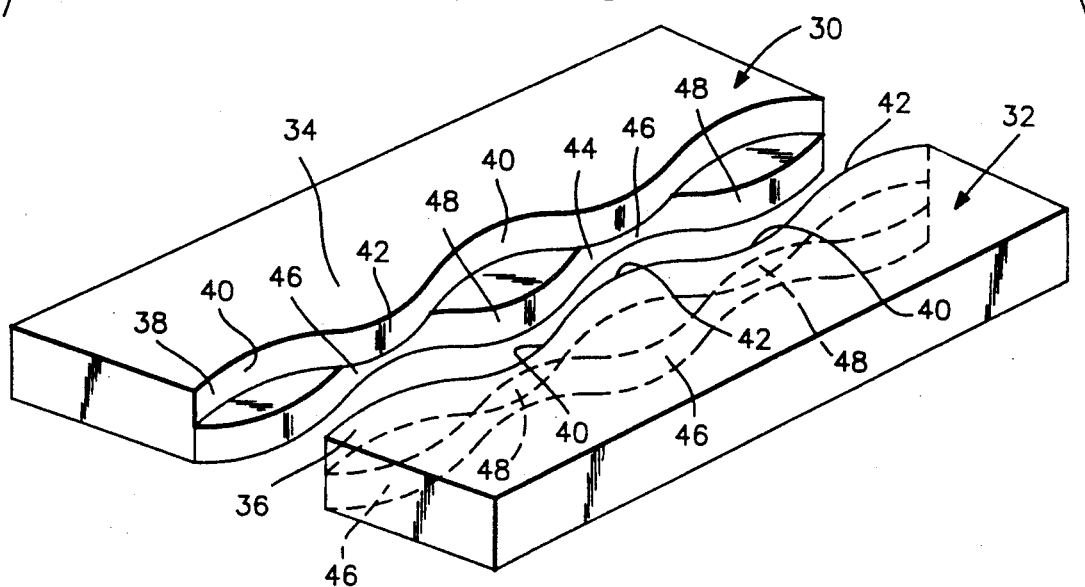
FIG. 5 is an exploded perspective view of two members to be joined utilizing the joint of the instant invention but with the members formed to accomplish an edge to edge joint resulting in a curved blended joint.
Figure 6:
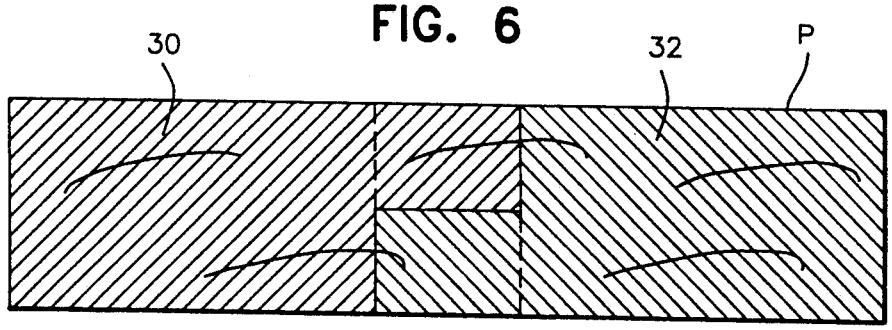
FIG. 6 is a fragmentary enlarged vertical sectional view of the components of FIG. 5 after being joined.

With reference now more specifically to FIGS. 5 and 6, there may be seen a pair of panel members referred to in general by the reference numerals 30 and 32 which are to be edge joined together.

The panel member 30 includes a marginal edge portion 34 to be joined to a mating marginal edge portion 36 of the panel member 32. The marginal edge portion 34 is provided with a first rabbet groove edge 38 of a width equal to substantially one-half the thickness of the panel member 30 and which comprises a sinuose groove including maximum depth portions 40 (rounded recesses) and minimum depth portions (rounded projections) 42. The marginal edge portion 34 also is provided with a second rabbet groove edge 44 including maximum depth portions 46 (rounded recesses) and minimum depth portions 48 (rounded projections), the maximum and minimum depth portions of the groove edges 38 and 44 being longitudinally offset relative to each other such that the maximum and minimum depth portions of the groove edge 38 are aligned with the minimum and maximum depth portions, respectively, of the groove edge 44. The marginal edge portion 36 is similarly shaped, but with the upper and lower sinuose rabbet groove edges thereof reversed in position relative to the groove edges 38 and 44 of the marginal edge portion 34.

FIG. 6 represents the manner in which the panel members 30 and 32 are fitted relative to each other, there being glue (not shown) applied to the opposing surfaces of the panel members 30 and 32. It will of course be noted that the upper and lower faces of the completed panel P illustrated in FIG. 6 show sinuose curve interfaces between the panel members 30 and 32.

Figure 7:
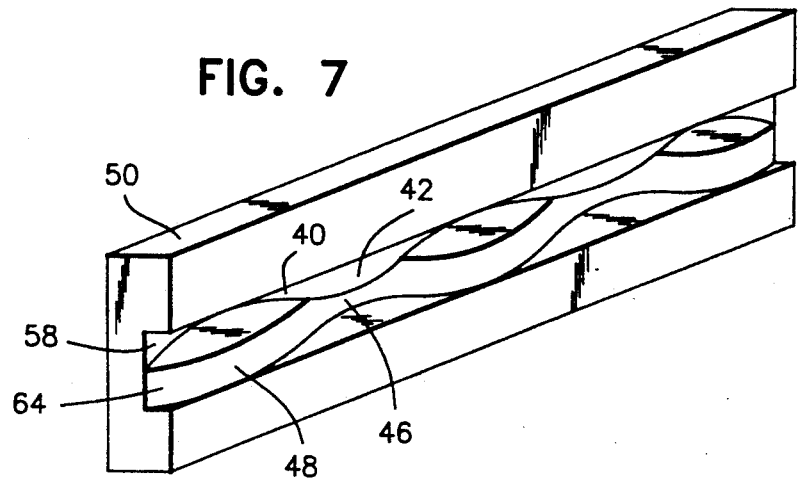
FIG. 7 illustrates the manner in which a basic edge to face double sinuose dado tongue and groove joint may be accomplished.

With reference now more specifically to FIG. 7, FIG. 7 represents a panel member 50 corresponding to the panel member 10, but which has a pair of sinuose dado grooves 58 and 64 formed therein corresponding to the rabbet groove edges 38 and 44 each also including alternating rounded projections 42, 48 and rounded recesses 40, 46. The panel member 58 thus may have a panel member 32 joined thereto in generally the same manner in which the panel member 12 is joined to the panel member 10. Here again, a sturdy interlocking joint is provided which automatically properly positions the two members to be joined together.

Although the foregoing has been primarily directed toward the utilization of a sinuose dado joint in the cabinet making industry and more particularly to cabinetry sheets or panel members constructed of pressed fibers or particles of wood, it is pointed out that, in this age of rapid technological advances, the instant invention also may be utilized in conjunction with solid wood, plywood, plywood and pressed wood combinations, plastics, metals and alloys, etc. Such panels may be pre-finished and include various forms of coatings or laminations.

The sinuose dado joint will provide an indexable joint in one operation and the joints may be fastened with adhesive, welds, shank-type fasteners, staples and set screws, etc., or in the case of the KD (knock-down) industry, specialized connectors for on site assembly.

Such applications may or may not include the beneficial characteristics of the instant invention when utilized in conjunction with a surface skin to core to surface skin sinuose dado joint used in conjunction with pressed wood, but the precise indexing of two members to be joined accomplished by the sinuose dado joint, together with ease of production, are inherent characteristics of the invention regardless of the material or materials of which two components to be joined are constructed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A sinuose tongue and groove dado joint between first and second members to be joined together by said joint, said first member having a side face provided with at least one elongated groove therein of a constant width and constantly varying depth and with portions of said side face disposed on opposite sides of said groove, said groove including a bottom surface in the form of a shallow, smoothly curving sine wave defining alternating deeper and shallower portions of said groove, the second member including a marginal edge tongue of constant thickness for mating with and snug reception within said groove between the opposite sides thereof, said tongue including a sine wave edge opposing and conforming to said shallow sine wave bottom surface and being seated and secured in said groove.

2. The sinuose tongue and groove dado joint of claim 1 wherein said first member includes a second groove formed therein adjoining and paralleling the first mentioned groove and also of a constant width and constantly varying depth and including a bottom surface in the form of a shallow, smoothly curving sine wave defining alternating deeper and shallower portions of said second groove with said deeper and shallower portions of each groove laterally registered with the shallower and deeper portions, respectively, of the adjoining groove, said tongue including adjacent generally half thickness edges thereof each contoured, longitudinally, into a shallow sine wave with alternating rounded projections and recesses conforming to said deeper and shallower portions, respectively, of said adjoining grooves, the rounded projections and recesses of each tongue half thickness edge being laterally registered with the rounded recesses and projections, respectively, of the other tongue half thickness edge.

3. The tongue and groove dado joint of claim 2 wherein said first member comprises a panel member having opposite side faces joined by marginal edges, said grooves being formed in one of said side faces of said panel member.

4. The tongue and groove dado joint of claim 1 wherein said first member comprises a panel member having opposite side faces joined by marginal edges, said groove comprising a single groove formed in one of said side faces.

5. The tongue and groove dado joint of claim 4 wherein said panel member is of a thickness equal to the width of said groove.

6. The tongue and groove joint of claim 4 wherein said panel member is of a thickness greater than the width of said groove.

7. The tongue and groove dado joint of claim 6 wherein said tongue is offset inwardly from each of said opposite side faces.

8. The tongue and groove dado joint of claim 6 wherein said tongue is inwardly offset from one of said side faces and is coextensive with the other of said side faces.

* * * * *